US009509867B2

(12) United States Patent
Camp, Jr. et al.

(10) Patent No.: US 9,509,867 B2
(45) Date of Patent: Nov. 29, 2016

(54) METHODS AND APPARATUS FOR COLLECTING IMAGE DATA

(75) Inventors: William O. Camp, Jr., Chapel Hill, NC (US); Mark Gavin Kokes, Raleigh, NC (US); Toby John Bowen, Durham, NC (US); Walter M. Marcinkiewicz, Chapel Hill, NC (US)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 1712 days.

(21) Appl. No.: 12/169,143

(22) Filed: Jul. 8, 2008

(65) Prior Publication Data

US 2010/0009700 A1    Jan. 14, 2010

(51) Int. Cl.
*H04W 24/00*    (2009.01)
*H04N 1/00*    (2006.01)
*H04M 1/725*    (2006.01)

(52) U.S. Cl.
CPC ..... *H04N 1/00307* (2013.01); *H04M 1/72572* (2013.01); *H04N 1/00244* (2013.01); *H04N 1/00323* (2013.01); *H04M 2250/10* (2013.01); *H04M 2250/52* (2013.01);
(Continued)

(58) Field of Classification Search
CPC .............. H04M 3/5315; G06F 3/0425; G06F 3/04845; G06F 3/1242; G06F 3/1415; G06F 3/1462
USPC .......... 455/456.6, 457, 556.1, 556.2; 348/50, 348/47, 73, 207.1, 207.11
See application file for complete search history.

(56) References Cited

U.S. PATENT DOCUMENTS

| 6,204,877 B1 | 3/2001 | Kiyokawa |
| 6,317,609 B1 * | 11/2001 | Alperovich et al. ........ 455/556.1 |
| 2001/0017668 A1 * | 8/2001 | Wilcock et al. .............. 348/552 |

(Continued)

FOREIGN PATENT DOCUMENTS

| EP | 1377038 A | 1/2004 |
| EP | 1675377 A | 6/2006 |

(Continued)

OTHER PUBLICATIONS

PCT International Search Report mailed Feb. 23, 2009 for International Application No. PCT/US2008/07922.

(Continued)

*Primary Examiner* — Keith Fang
(74) *Attorney, Agent, or Firm* — Coats & Bennett, PLLC (57) ABSTRACT

An image processing system identifies desired views of a particular subject and triggers a mobile camera device in proximity to the subject to capture a digital image, thus collecting new image data to augment an existing database. In an exemplary method, location data for a camera-equipped mobile communication device in visual proximity to a subject of interest is received at an image collection server. Upon determining whether the location data corresponds to a desired view of the subject of interest, the image collection server sends an image capture request to the mobile device, triggering the user of the device to capture an image of the subject. Finally, digital image data is received from the mobile communication device in response to the image capture request. The digital image data may then be used for assembling a composite representation of the subject of interest, such as a 3D model of the subject.

12 Claims, 4 Drawing Sheets

(52) U.S. Cl.
CPC ........... *H04N 2201/0074* (2013.01); *H04N 2201/0098* (2013.01); *H04N 2201/3253* (2013.01)

(56) References Cited

U.S. PATENT DOCUMENTS

| | | | |
|---|---|---|---|
| 2001/0024236 A1* | 9/2001 | Sato et al. | 348/239 |
| 2001/0028399 A1 | 10/2001 | Conley | |
| 2003/0063194 A1 | 4/2003 | Nishiyama et al. | |
| 2003/0076413 A1 | 4/2003 | Kanade et al. | |
| 2003/0231243 A1* | 12/2003 | Shibutani | 348/207.99 |
| 2004/0090526 A1* | 5/2004 | Watanabe et al. | 348/207.1 |
| 2004/0189517 A1* | 9/2004 | Pande et al. | 342/357.06 |
| 2005/0172147 A1 | 8/2005 | Edwards et al. | |
| 2006/0001744 A1 | 1/2006 | Singh | |
| 2006/0056056 A1* | 3/2006 | Ahiska et al. | 359/690 |
| 2006/0152592 A1* | 7/2006 | Chishima et al. | 348/211.3 |
| 2007/0065002 A1* | 3/2007 | Marzell | G06T 7/0051 382/154 |
| 2007/0146798 A1* | 6/2007 | Eto et al. | 358/302 |
| 2007/0242131 A1* | 10/2007 | Sanz-Pastor et al. | 348/14.02 |
| 2008/0059065 A1* | 3/2008 | Strelow et al. | 701/213 |
| 2008/0106597 A1* | 5/2008 | Amini et al. | 348/143 |
| 2009/0115892 A1* | 5/2009 | Sako et al. | 348/376 |
| 2009/0162042 A1* | 6/2009 | Wexler et al. | 396/49 |

FOREIGN PATENT DOCUMENTS

| | | |
|---|---|---|
| EP | 1924084 A | 5/2008 |
| WO | 2008040566 | 4/2008 |

OTHER PUBLICATIONS

U.S. Appl. No. 12/059,095, filed Mar. 31, 2008.

Snavely, Noah, et al., "Photo Tourism: Exploring Photo Collections in 3D," ACM Transactions on Graphics (SIGGRAPH Proceedings) 25(3) 2006, pp. 835-846.

Toyama, Kentaro, et al., "Geographic Location Tags on Digital Images," Multimedia '03: Proceedings of the 11th ACM International Conference on Multimedis, ACM Press, New York, NY, pp. 156-166.

McCurdy, Neil J. and Griswold, William G., "A Systems Architecture for Ubiquitous Video," Proceedings of the 3rd International Conference on Mobile Systems, Application, and Services, (Seattle, Washington, Jun. 6-8, 2005), ACM, New York, NY, 14 pages.

Barry, Patrick L., "Pictures Posing Questions," Science News, vol. 171, No. 14, Apr. 7, 2007, pp. 216-217, 219.

* cited by examiner

METHODS AND APPARATUS FOR COLLECTING IMAGE DATA

BACKGROUND

The present invention relates generally to communication systems. More specifically, the invention relates to methods and apparatus for collecting image data from camera-equipped communication devices for use in assembling a composite representation of a visual subject.

With the convergence of voice and data communication networks, portable communication devices are increasingly likely to support several communication modes as well as a number of communication-related applications. Single-purpose cellular phones and alphanumeric pagers have given way to complex mobile devices supporting voice communications, e-mail, and instant messaging. A typical device often includes a camera, a music player, and sound recorder, and may include a global positioning system (GPS) receiver.

In particular, camera-equipped camera phones are ubiquitous in many regions, sparking considerable research interest in so-called ubiquitous computing applications that exploit the widespread availability of networked cameras. Terms like "telepresence," "tele-reality," "tele-existence," "tele-immersion," and the like have been coined to refer to technologies that allow a person to experience stimuli as though he or she were at a particular remote application. Much of the advanced research in these areas focuses on the use of networked, mobile, video or still cameras. For example, Neil J. McCurdy and William G. Griswold describe a systems architecture for providing a "reality fly-through," based on video feeds from networked mobile cameras, in their article "A Systems Architecture for Ubiquitous Video," in *Proceedings of the 3rd International Conference on Mobile Systems, Applications, and Services* (Seattle, Wash., Jun. 6-8, 2005), ACM, New York, N.Y., 1-14.

A related area of research is directed to improved systems for organizing, accessing, and viewing large collections of digital photographs. A database system for organizing collections of photographs using associated geographic location tags is described by Kentaro Toyama, Ron Logan, Asta Roseway, and P. Anandan in their article "Geographic Location Tags on Digital Images," in *MULTIMEDIA '03: Proceedings of the 11th ACM International Conference on Multimedia*, ACM Press, New York, N.Y., USA, 156-166. Researchers Noah Snavely, Steven M. Seitz, and Richard Szeliski describe a more advanced approach to organizing photographs of a point of interest using a three-dimensional model, in their article "Photo Tourism: Exploring Photo Collections in 3D," *ACM Transactions on Graphics (SIGGRAPH Proceedings)*, 25(3), 2006, 835-846. With this approach, locations and orientations for each of several photographs associated with a particular point of interest are automatically computed from the image data itself. The various images are combined into a three-dimensional model of the point of interest, enabling a unique user interface for browsing among the discrete images.

Finally, additional research is ongoing into "computational photography," especially into technologies for combining data from several digital images to form a new, perhaps improved, digital image. A few of these computational photography technologies are briefly described by Patrick L. Barry in "Pictures Posing Questions," *Science News*, Vol. 171, No. 14, Apr. 7, 2007, 216-17, 219.

As evidenced by the above-described projects, considerable efforts have been devoted to developing image processing, organization, and presentation technologies. On the other hand, far less attention has been devoted to improved techniques for gathering digital images in a ubiquitous computing environment.

SUMMARY

Although various systems for organizing, processing, and browsing digital images have been developed, the starting point for the development of these systems is generally a pre-existing database of digital images, or a pre-defined set of image sources. Thus, the developers of these systems tend to ignore the process of collecting the images, or organizing the image sources. In several telepresence or tele-reality applications, augmenting an existing database or set of image sources can be useful. For example, as noted above, the "photo tourism" system described by Snavely et al. can assemble a composite representation of a subject of interest, in this case a three-dimensional (3D) model of a tourist site, from a pre-existing database of images, thus allowing a user to browse from image to image based upon the perspectives from which the images were taken.

However, an existing database for a particular site is unlikely to contain digital images taken from every possible perspective, and may lack images from key perspectives, such that certain details of the site, which would be visible to an ordinary observer actually at the site, are missing from the composite representation. Accordingly, in some embodiments of the invention, an image processing system identifies desired views of a particular subject and triggers one or more mobile camera devices in locations corresponding to those desired views to capture an image of the subject of interest. In this manner, an imaging processing system can "fill in" the details of a composite representation of a subject of interest, by collecting new image data to augment sparse regions of an existing representation.

Thus, in an exemplary method according to some embodiments of the present invention, such as might be implemented at an image collection server, location data for a camera-equipped mobile communication device in visual proximity to a subject of interest is received. Upon determining whether the location data corresponds to a desired view of the subject of interest, the image collection server sends an image capture request to the mobile device, thus triggering the device to automatically capture an image of the subject or, in some embodiments, simply encouraging the user of the device to capture an image. Finally, digital image data is received from the mobile communication device in response to the image capture request. The digital image data may then be used for assembling a composite representation of the subject of interest, such as a 3D model of the subject.

In some embodiments, camera position data corresponding to the digital image data is also received and stored in association with the digital image for use in assembling the composite representation of the subject of interest. This camera position data may comprise camera location data, indicating a location for the mobile communication device at the time the digital image was captured, or camera orientation data, indicating the camera's orientation at the time of the snapshot, or both. However, in some systems one or both of these items may be unnecessary, since, for example, the image processing system might instead calculate an estimated position corresponding to the snapshot, based on the image data itself.

In some embodiments, the image collection server may be configured to determine a desired reference position with respect to the subject of interest, and to form a position instruction based on the desired reference position. This positioning instruction may be included in the image capture request and may comprise reference location data, reference orientation data, or both, for use in capturing the digital image data.

An exemplary mobile communication device, according to some embodiments, may thus receive the image capture request from the image collection server, alert the user of the device to the request, and send any subsequently captured digital image data back to the image collection server. In those embodiments where the image capture request comprises a positioning instruction, the mobile communication device may be further configured to provide the user with visual cues, using a display of the mobile communication device, to aid in capturing the digital image from the desired perspective. Thus, some embodiments of a mobile communication device may be configured to alter the information displayed to the user to reflect the positioning request. For example, the mobile communication device may be configured to display one or more orientation guides on the display, based on a reference orientation supplied in the positioning instruction and a current orientation for the mobile device. Similarly, the mobile device might be configured to display one or more location guides, such as a navigational arrow, based on reference location data supplied in the positioning instruction and the current location of the mobile communication device.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention is described below in reference to a wireless telecommunication system providing voice and data services to a mobile device. Various systems providing voice and data services have been deployed, from $2^{nd}$-generation systems such as GSM (providing circuit-switched communications) and GPRS (providing packet-switched communications) to $3^{rd}$-generation systems such as those standardized by the $3^{rd}$-Generation Partnership Project (3GPP). Still other systems are currently under development. These systems may employ any or several of a number of wireless access technologies, such as Time Division Multiple Access (TDMA), Code Division Multiple Access (CDMA), Frequency Division Multiple Access (FDA), Orthogonal Frequency Division Multiple Access (OFDMA), Time Division Duplex (TDD), and Frequency Division Duplex (FDD), and so on. The present invention is not limited to any specific type of wireless communication network or access technology. Indeed, those skilled in the art will appreciate that the network configurations discussed herein are only illustrative. The invention may be practiced with devices accessing voice and/or data networks via wireless local area networks (WLANs) as well as wide-area wireless networks.

Figure 1:
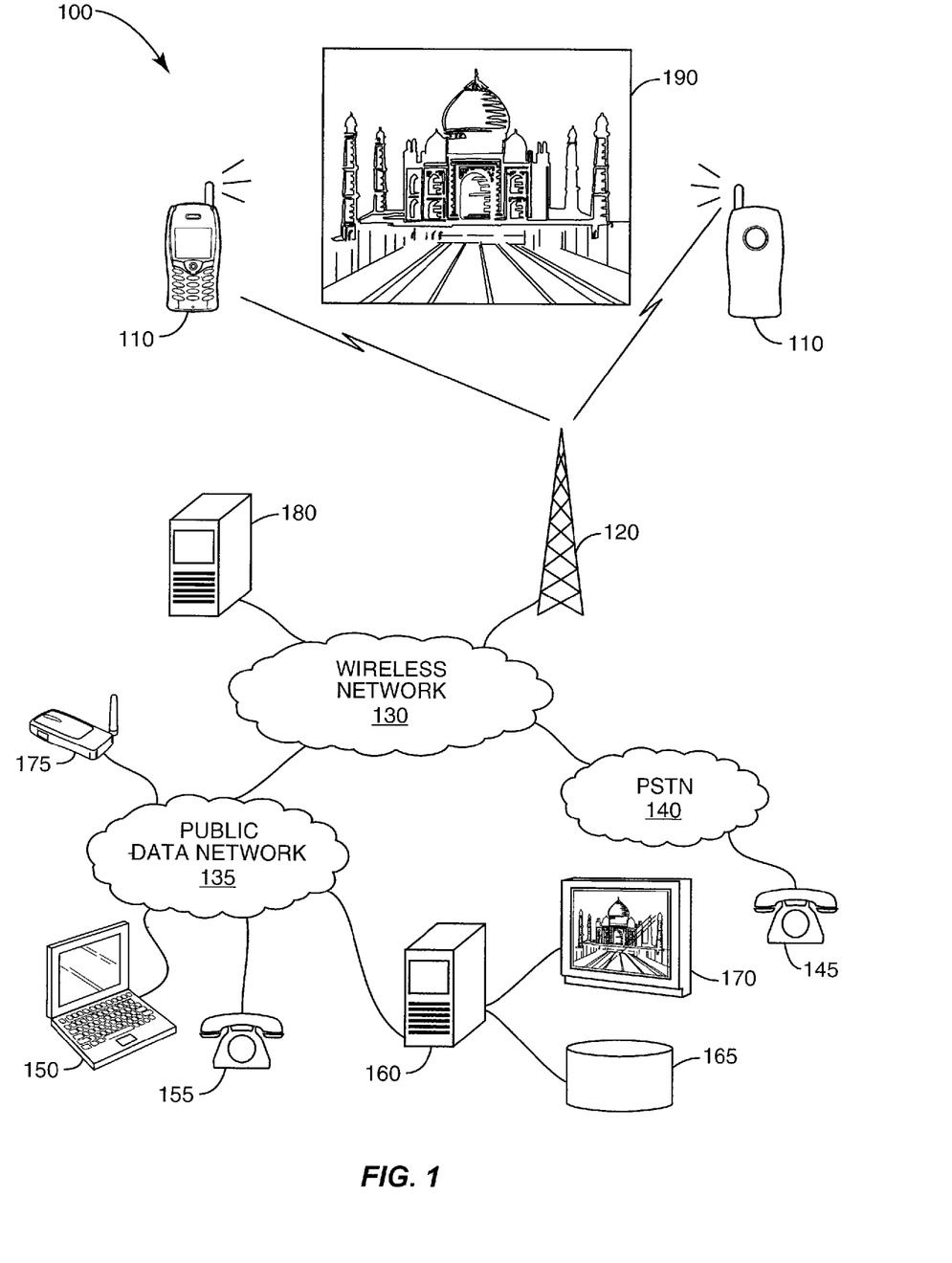
FIG. 1 illustrates a communication system according to one or more embodiments of the present invention.

FIG. 1 illustrates an exemplary communication system 100 in which the present invention may be employed. Mobile devices 110, each of which is equipped with a camera, communicates with other devices and servers through base station 120, which is connected to wireless network 130. Wireless network 130 is in turn connected to a public data network (PDN) 135, which may be, for example, the Internet. Wireless network 130 is also connected to Public Switched Telephone Network (PSTN) 140. Wireless devices 110 can thus communicate with each other and with various other devices through the wireless network 130 and PDN 135 or PSTN 140, including such devices as conventional land-line telephone 145, personal computer 150, and voice-over-Internet-Protocol (VoIP) phone 155. As shown in FIG. 1, wireless devices 110 also have access to data server 160 via the PDN 135; data server 160 may be configured to provide access through PDN 130 to data or applications stored in storage device 165. Storage device 165 may comprise one or more of a variety of data storage devices, such as disk drives connected to data server 150 or one or more other servers, a Redundant Array of Independent Disks (RAID) system, or the like.

Communication devices 110 may be cordless telephones, cellular telephones, personal digital assistants (PDA), communicators, computer devices, or the like, and may be compatible with any of a variety of communications standards, such as the Global System for Mobile Communications (GSM) or one or more of the standards promulgated by 3GPP. Mobile devices 110 each include a digital camera, for capturing still and video images, and may also include a digital sound recorder and digital music player application. Mobile devices 110 may also support various applications in addition to voice communications, such as e-mail, text messaging, picture messaging, instant messaging, video conferencing, web browsing, and the like.

In some embodiments, mobile devices 110 may also include a wireless local-area network (WLAN) transceiver configured for communication with WLAN access point 175. WLAN access point 175 is also connected to PDN 135, providing communication devices 110 with alternative connectivity to Internet-based resources such as data server 160.

Also connected to wireless network 130 is location server 180. Location server 180 is often maintained by the operator of wireless network 130, but may be separately administered. One function of location server 180 is to determine the geographic location of mobile terminals (such as mobile devices 110) using the wireless network 130. Location information obtained by location server 180 may range from information identifying the cell currently serving a mobile device 110 to more precise location information obtained using Global Positioning System (GPS) technology. Location-based services provided by location server 180, either by itself or in conjunction with other servers, may include the translation of geographic location information (e.g., latitude and longitude) into an address or a place name. Thus, location information provided by location server 180 may indicate that a mobile terminal is at "home", or in "Raleigh," instead of or in addition to indicating physical coordinates.

Other technologies, including triangulation methods exploiting signals transmitted from or received at several base stations, may also be used to obtain location information. Triangulation techniques may include Time Difference of Arrival (TDOA) technology, which utilizes measurements of a mobile's uplink signal at several base stations, or Enhanced-Observed Time Difference (E-OTD) technology, which utilizes measurements taken at the mobile terminal 100 of signals sent from several base stations. GPS-based technologies may include Assisted GPS, which utilizes information about the current status of the GPS satellites derived independently of the mobile devices 110 to aid in the determination of the terminal's location. Finally, a mobile device's location might also be determined from proximate resources, such as a beacon transmitted over a short-range wireless link from a fixed device near a device user's current location.

In addition to being capable of measuring or otherwise determining its location, a mobile device 110 may also be capable of determining its orientation, using one or more built-in sensors. As used herein, "orientation" may refer simply to a direction in which a device is pointed, where the direction may comprise only a compass direction or azimuth (e.g., NNW, or 323°), or may be an azimuth plus an elevation. Orientation may also include a measure of "tilt" or rotation of the device around the direction the device is pointing. Those skilled in the art will appreciate that orientation may be recorded and represented in a number of formats, whether one, two, or three dimensions are measured. A variety of inexpensive electronic sensors are available for determining the orientation of a device, including electronic compasses (e.g., using the KMZ51 or KMZ52 magneto-resistive sensor from Philips Semiconductors), accelerometers (e.g., based on Micro-Electro-Mechanical Systems, or MEMS, such as the ADXL330 3-axis accelerometer from Analog Devices), and gyroscopes (e.g., the ADXRS614 MEMS gyroscope from Analog Devices). The use of orientation detection and/or tilt detection is thus becoming quite common in consumer devices, such as electronic games.

Those skilled in the art will appreciate that a multimedia device may thus be configured to measure its location and orientation while recording image data or other multimedia data, and to save location and orientation information in association with the recorded multimedia file. Thus, referring once more to FIG. 1, one or both mobile devices 110 may capture a digital image of a photographic subject 190 (here, the Taj Mahal) and associate the captured image data with orientation data and/or location data reflecting the camera's position when the snapshot of subject 190 was taken. The mobile device may then transmit the digital image (along with the orientation data and/or location data) to data server 160, which may store the digital image in data storage device 165 and/or allow users to view the image at display device 170.

As noted above, various image processing applications involve the collection of numerous digital images. In some cases, these image processing applications may further involve the assembly or maintenance of a composite representation of a subject of interest. For example, an image processing application may index images according to an association with the subject of interest, using, for instance, identifying tags associated with the images or geographic location data corresponding to the images. In other applications, assembling the composite representation of the subject of interest may involve constructing a 3D model of the subject.

If timely location information corresponding to camera-equipped mobile communication devices in the proximity of the subject of interest is available, then the collection of image data for use in assembling these composite representations may be improved. For instance, an image processing application that indexes digital photographs by location may be programmed to recognize that a particular location or region (which may correspond to a country, a city, or a specific address or tourist site) is sparsely represented in the database. Upon receiving an indication that a camera-equipped mobile communication device, e.g., a camera-phone, is in or near the desired location, the image processing application may then send a message to the mobile device, requesting the capture of a digital image to add to the database. Although in some cases this message might trigger an automatic image capture by the mobile device, a suitable image is more likely to be collected with the active cooperation of the device's user. Thus, in many cases, the image capture request is directed to the user of the device. In any event, after an image is captured, the digital image is transferred to the image processing application, using conventional data communication means.

In various embodiments, an image collection application (which may be part of or tightly coupled to any of the specific image processing applications discussed above) receives location information corresponding to a particular group of camera-equipped mobile communication devices. This group may comprise camera-phones belonging to subscribers associated with the image processing application. For example, an online photo-sharing service may solicit volunteers from its users, wherein the volunteers agree to allow the image collection application access to location information for their camera-phones. This might comprise a general permission, such that the image collection application has continuous and frequent access to the mobile device's location. In other situations, the permission may be more limited, such that, for example, the application only has access to location information for a mobile device during a limited period, such as during the user's vacation.

Groups of camera-phones that are "tracked" for the purposes of collecting images may be created for a specific occasion as well. For example, a tourist group visiting one or more particular sites may use an image processing application to collect images of the site and assemble a composite representation of the site, using, for instance, a 3D modeling approach such as was described earlier. In this scenario, the group of mobile communication devices that are tracked is a limited group defined specifically for this purpose—camera-phones for each member of the group may be registered with the image processing application.

Given the preceding examples, those skilled in the art will appreciate that an image collection application configured according to one or more embodiments of the present invention may reside on a server that is geographically remote from the one or more photographic subjects of interest. Thus, a server or set of servers physically located in one country can receive location information for mobile devices at a subject site on the other side of the world. For example, a photo tourism application residing on servers in the United States may collect location information from mobile devices in the vicinity of the Taj Mahal, process that location information, and request the capture of additional digital images of the site.

On the other hand, other embodiments of the invention may involve image collection applications executing on a device that is physically close to the photographic subject of interest. For instance, an image collection application used by a tourist group may reside on a laptop computer or other portable device carried by one of the group's members. This "master" device, which may itself be equipped with a camera and thus capable of collecting images, could thus coordinate the collection of digital images from "slave" devices carried by other members of the group.

Figure 2:
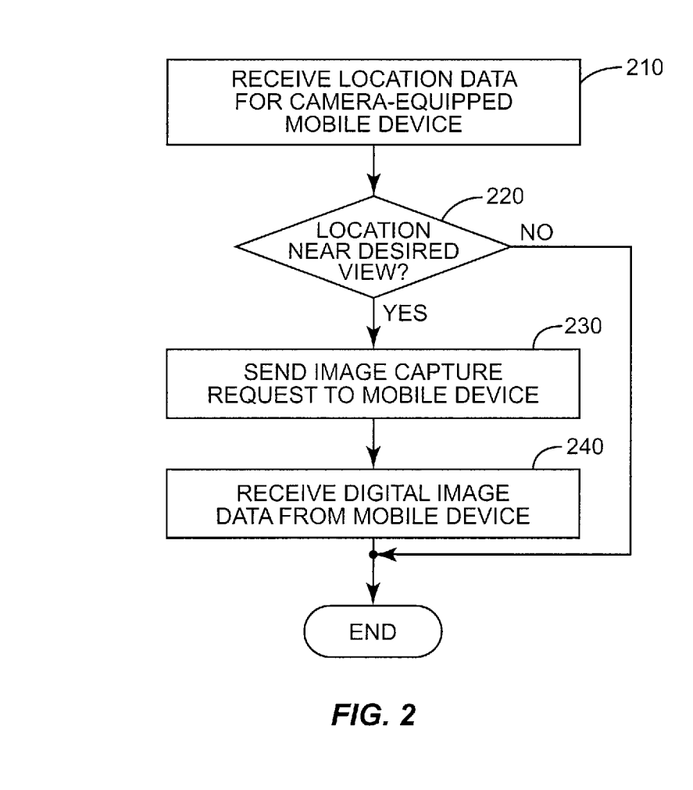
FIG. 2 is a logic flow diagram illustrating an exemplary method for collecting image data.

A general method for collecting digital image data associated with a subject of interest from one or more camera-equipped mobile communication devices in the vicinity of the subject of interest is illustrated in FIG. 2. The process depicted in FIG. 2, which may be implemented, for example, using an image processing and/or image collecting server, may be readily understood by the skilled practitioner in view of the previously described, non-limiting, examples of image processing applications.

The image collection process illustrated in FIG. 2 begins at block 210, with the receiving of location data for a camera-equipped mobile communication device. As noted above, an image collection server may, in some embodiments of the invention, be configured to receive location updates for devices operated by a group of subscribers. The image collection server may, for example, be provided with periodic updates of each device's location. Alternatively, location data may be supplied to the image collection server only in response to a significant change in location for a particular device. Those skilled in the art will appreciate that the location data may come from the mobile devices themselves, in some embodiments, or from a source separate from the mobile device itself, such as from a location server 180.

In some embodiments, the location data received at the image collection server may be associated with a file uploaded by the mobile communication device. For instance, a device user may capture an image of a tourist attraction, and upload it to the image collection server for storage. Metadata included in or associated with the image file may indicate the location corresponding to the image. In some cases, this metadata may include detailed geographic coordinates, such as might be derived from a GPS receiver. In other cases, the metadata may include a label or tag that indicates a location by name, e.g. "The Taj Mahal," "Piccadilly Circus," or "Berlin."

At block 220, the location data, whether it comprises geographic coordinates or simply a name for a location, is analyzed to determine whether the mobile device's location is near a desired view of the subject of interest. In some cases, this may be as simple as comparing geographic location data for the mobile device to one or more pre-determined areas of interest. For instance, the location data might indicate that the mobile device is in Prague, which is on a pre-determined list of cities of interest. For a particular application, any and all images of the city might be desired. In this case, the image collection server might generate a message to be sent to the mobile device at block 230, requesting that the device's user capture one or more images of the city.

In other applications, the analysis of the location data might be more detailed. For instance, the application might determine that a particular site in Prague is particularly popular (based, for example, on previously submitted photographs, or based on user requests), in which case the mobile device may only be of interest if it is at or near that particular site. Thus, the application may determine that the location data received from the mobile device indicates that the device is proximate to the Petrin Gardens, and that any snapshot of or from the Petrin Gardens is a desired view.

Some applications may conduct an even deeper analysis of the location data. For example, an image processing application that is assembling or maintaining a 3D model of a particular subject, e.g., the Taj Mahal, may determine that a particular perspective is poorly covered by existing images, or not covered at all. Thus, the application may determine that one or more views or perspectives of the subject are particularly desirable. If the received location data indicates that the mobile device is at or near a location corresponding to the desired view, then an image capture request may be generated and sent to the mobile device, again as shown at block 230.

The image capture request may, in some embodiments of the invention, simply comprise a message (e.g., an SMS message) directed to the user of the mobile device and requesting that the user capture an image of the desired subject. In general, the image capture request may be sent to the mobile device using any appropriate protocols. For instance, SMS, e-mail, and/or instant messaging technologies may be used. In some cases, an application-specific protocol may be used for sending the image capture requests.

In some embodiments, the image capture request may be accompanied by images (or links to images) of other views of the subject of interest, or of nearby or related subjects. These may be provided to encourage users to submit more images, or specific images, for the server's database. Thus, for example, a device user might capture an image of Piccadilly Circus and upload it to an online photographic storage service. An image collection server associated with the service might respond by querying the user whether she would like to see photographs of other London sites, along with one or more requests for other images of the area.

In some embodiments, as will be described more fully below, the image capture request may include positioning instructions to aid the user in capturing a particularly suitable view of the subject. In some embodiments, however, the image capture request may be processed automatically by the mobile device, automatically triggering an image capture by the device. In this latter case, the triggering of the snapshot may be subject to the satisfaction of one or more other conditions, e.g., that the device's camera is at or near a precise location or oriented in a particular way, that lighting conditions are acceptable, or the like.

Finally, as shown at block 240, digital image data corresponding to the subject of interest is received from the mobile device. In some embodiments, the mobile device may be configured to automatically transfer digital image data as soon as it is captured by the device. In these embodiments, the digital image may be transferred using any wireless data service available to the device. In other embodiments, digital images captured after the image capture request is received may be stored for later "uploading" to the image collection server, in which case the transfer may use wireless or "wired" data communication means. In either case, the transfer of one or more digital images to the image collection server may be conditional, depending, for instance, on whether the image capture conditions match a set of conditions specified by the image capture request. Furthermore, position data, including the location or orientation of the camera at the time of the snapshot, or both, may be transferred along with the digital image in some embodiments.

As noted above, the image capture request may include a positioning instruction for aiding the device or device user in capturing a particularly suitable image. (Those skilled in the art will appreciate that the image capture request may comprise a single message, or a series of messages, any or several of which may include the positioning instruction.) This positioning instruction may comprise a reference orientation and/or a reference location for the device's camera, corresponding to a desired reference position.

Figure 3:
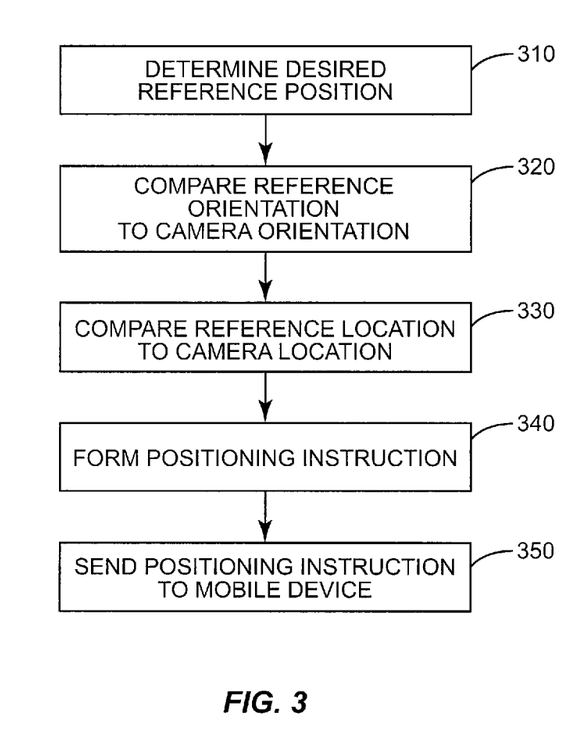
FIG. 3 is a logic flow diagram illustrating a process for providing a mobile communication device with a positioning instruction.

FIG. 3 illustrates an exemplary process for forming a positioning instruction and forwarding it to the mobile device, beginning at block 310 with the determination of a desired reference position. In some cases, the determination of a desired reference position may be performed with reference to a pre-existing model of a subject of interest. For instance, a 3D model of the Taj Mahal, assembled from several pre-existing photographs, may include one or more perspectives that are poorly covered by existing images, or not covered at all. In this case, the image processing application may determine a desired reference position based on the existing model, determining that one or more particular perspectives are desired. From the desired perspective, a desired reference position may thus be determined. This reference position may include a specific geographic location (e.g., latitude, longitude, and altitude), a bounded region, or a line radiating outward from the subject of interest. Those skilled in the art will appreciate that the latter may be combined with a magnification, or "zoom," factor to obtain a particular desired view of the subject of interest. The desired reference position may also include a desired orientation of the camera device.

At block 320, the reference orientation is compared to the current orientation of the user's camera device, as reported by the camera device. (Those skilled in the art will appreciate that orientation data may not be available to the image processing application in some embodiments.) Similarly, the reference location is compared to the current camera location, as shown in block 330.

At block 340, a positioning instruction is formed, and sent to the mobile device at block 350. In some cases, the positioning instruction may simply include the reference position, which may be indicated by a text label (e.g., "100 meters from the north side of the Eiffel tower") or geographic coordinates. In other cases, the positioning instruction may be based on the comparison between the reference position and reported position information for the mobile device (e.g., "100 meters north of your current position, then left"). In some embodiments, the positioning instruction may be intended for use by a device operator, in which case the instruction may comprise text or image data for displaying to the user. In other embodiments, the positioning instruction may instead be intended for use by the mobile device itself. For example, as will be described below in more detail, a mobile device may be configured to compare a reference position communicated in a positioning instruction to the device's current position to generate one or more guiding aids for the user.

Figure 4:
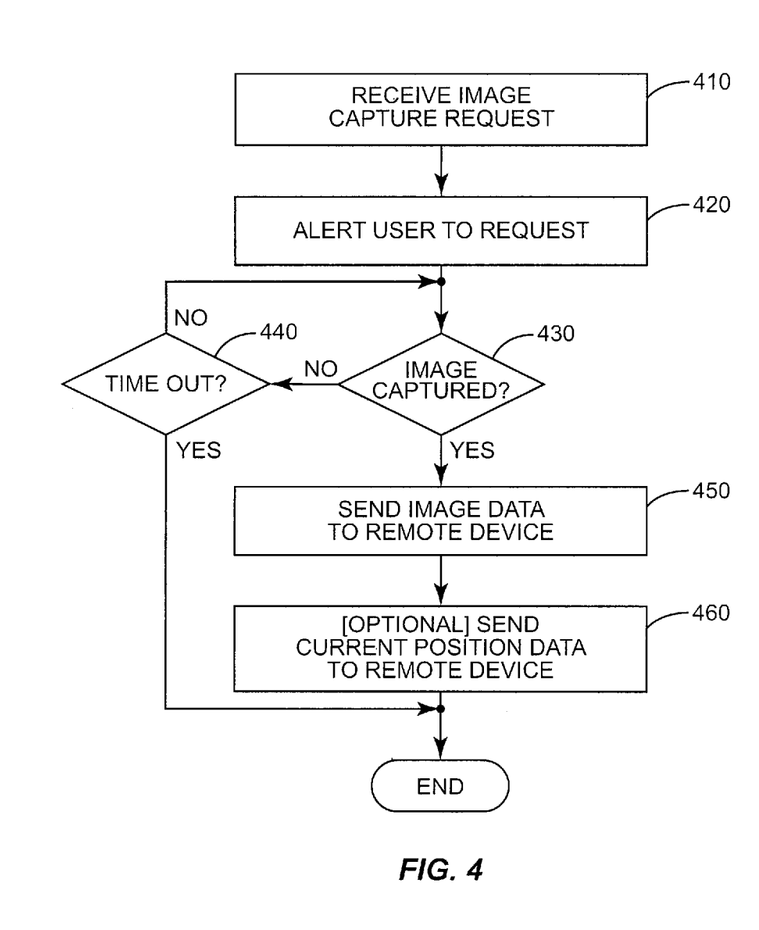
FIG. 4 is a logic flow diagram illustrating an exemplary method for collecting image data with a camera-equipped mobile communication device.

FIG. 4 illustrates generally a method for collecting image data with a camera-equipped mobile communication device, beginning, as shown at block 410, with receiving an image capture request from a remote device, such as an image collection server. In some embodiments of the invention, the image capture request triggers an alert for the user of the device, as shown at block 420. Thus, an audible or visual indicator, or both, may be used to alert the user to the image capture request. In some embodiments, this alerting step may simply comprise alerting the device user that a message has been received, in which case the user may be required to retrieve the message (from device memory, or from a network location) before receiving the details. In other embodiments, for example, one or more details of the image capture request may automatically appear on a display of the device, or a particular audible signal specifically indicating an image capture request may be provided for the user.

After receiving an image capture request, the receiving mobile device may monitor the device's status to detect the capturing of an image, as shown at block 430. In some cases, this monitoring may be subject to a "time-out" period, as indicated at block 440. This time-out interval, which may be pre-determined or set by the image capture request, provides one mechanism for determining the relevance of a particular image request to a subsequently captured image. Thus, an image (or images) captured within the time-out period is forwarded to the remote device, responsive to the image capture request, as shown at block 450. In these embodiments, the process simply ends if the time-out interval expires without the capture of an image.

Those skilled in the art will appreciate that other mechanisms may be used to effectively "filter" the images sent to the image collection server. For instance, one or more quality metrics may be computed for the digital image, and compared to a corresponding threshold quality level. Only images meeting or exceeding the specified threshold quality might be sent in these embodiments. The thresholds may be pre-determined, or specified with the image capture requests, and may correspond to various attributes associated with the image, such as lighting, contrast, and the like.

Those skilled in the art will also appreciate that information associated with the image may also be sent to the image collection server, either as part of a digital image file or separately. Thus, "metadata" might be sent with the image, such as position data indicating the location and/or orientation of the camera at the time of the image capture, as shown at block 460. Other metadata, such as an identifier for the device and/or the device user, the time and/or date of the image capture, and the like, may also be sent to the image collection server for use in organizing or otherwise processing the transferred image In addition to simply requesting that a device or its user capture an image, the image capture request may also include a positioning instruction, as described earlier. An exemplary process for processing such a positioning instruction, suitable for implementation at a camera-equipped mobile communication device such as a camera-phone, is thus pictured in FIG. 5.

Figure 5:
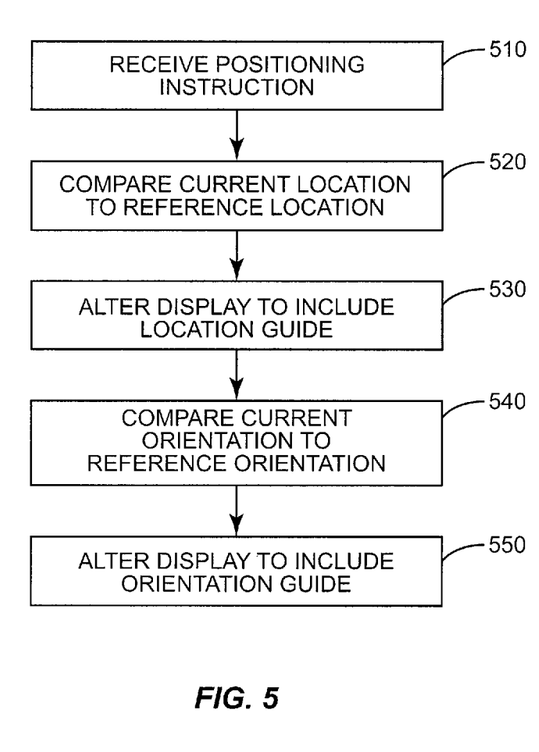
FIG. 5 is another logic flow diagram, illustrating exemplary processing of a positioning instruction according to some embodiments of the invention.

The method illustrated in FIG. 5 begins with the receiving of a positioning instruction by a mobile device, as shown at block 510. As described earlier, the positioning instruction may comprise a reference position, including a reference orientation and/or a reference location. In the illustrated embodiment, the positioning instruction comprises both. Thus, at block 520, a current location for the mobile device, determined according to any of the mechanisms discussed herein, is compared to the reference location included in the positioning instruction. Then, as shown at block 530, a user display is altered, based on this comparison, to include some sort of location guide for use by the device user in finding an appropriate location for capturing a snapshot of the subject of interest.

Similarly, a current orientation for the mobile device, derived, for instance, from one or more tilt sensors or accelerometers, is compared to the reference orientation data included in the positioning instruction. This is shown at block 540. At block 550, the display of the device is again altered, to reflect an orientation guide for aiding the user in orienting the camera device.

As will be readily understood by the skilled practitioner, the orientation and location guides may employ any of a variety of techniques for aiding the user in attaining the desired position for the mobile camera device. For instance, the orientation guide may comprise one or more visual arrow indicators, indicating a direction (and, optionally, a magnitude) of rotation. In some embodiments, one indicator might indicate a direction of rotation about a vertical axis, indicating that the device user must turn to face another direction. Another indicator might indicate that the camera itself should be rotated, e.g., about one or more horizontal axes, to obtain the desired view of the subject of interest. A "level line" indicating a deviation of the camera's orientation to a desired orientation might also be used.

Similarly, any of a variety of visual indicators might also be used to guide the device user to a location near the reference location. Text instructions might be used, alone or in combination with other visual indicators. A simple map might be displayed, indicating a direction and/or distance between the camera's current location and the reference location. Again, arrows or other indicators might also be used.

As was discussed earlier, several of the above-described methods may be implemented at an image collection server, which may in some cases be physically distant from any of the camera-equipped mobile communication devices and the photographic subject of interest. Thus, various embodiments of the invention may comprise an image collection server implemented using a conventional network-attached server, which may in turn be implemented using a general-purpose or special-purpose network-connected computer. Other embodiments, as suggested above, may be implemented using a portable device, including a camera-equipped mobile communication device.

Figure 6:
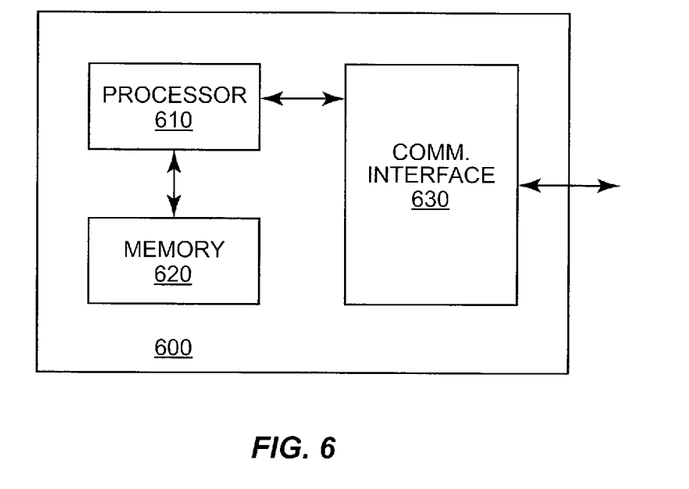
FIG. 6 is a block diagram illustrating an image collection server according to some embodiments of the invention.

In any case, a block diagram illustrating exemplary functional components of an image collection server according to one or more embodiments of the invention is provided in FIG. 6. Those skilled in the art will appreciate that the pictured server may be configured to implement one or more of the methods described above, such as the methods pictured in FIGS. 3 and 4, and may optionally be configured to execute one or more other applications or to provide one or more other services to the mobile communication devices or other networked devices. Thus, for example, image collection server 600 may comprise a server dedicated to one or more of the image collection processes described herein, making the results available to one or more other servers that provide other image processing functionality. Alternatively, image collection server 600 may also be configured to execute one or more image processing applications, such as the 3D modeling techniques or database organization techniques described above.

Image collection server 600 comprises at least one processing circuit 610 connected to a memory circuit 620 and a network interface 630. Memory circuit 620 may include one or more non-volatile memory elements, such as flash memory, magnetic disk drives, or optical storage devices. Network interface 630 enables the processing circuit 610 to send and receive data to/from mobile communication devices and other network-connected devices via public data network 135 and/or wireless network 130. The network interface 630 may also provide the processing circuit 610 with access to a database stored in an external data storage unit, such as the data storage unit 165 described earlier. Such a database might be used to store images collected from mobile devices or other sources.

In various embodiments of the present invention, image collection server 600 is configured to carry out one or more of the methods described above. In particular, processing circuit 610 may be configured, using appropriate software stored in memory circuit 620, to receive, via communication network interface 630, location data for a camera-equipped mobile communication device in visual proximity to a subject of interest, and to determine whether that location data corresponds to a desired view of the subject of interest. If so, processing circuit 610 may be further configured to send an image capture request to the mobile communication device, using network interface 630, and to receive, responsive to the request, digital image data from the mobile communication device.

In some embodiments, processing circuit 610 may be further configured to receive camera position data corresponding to the digital image data, and to store the camera position data in association with the digital image data for use in assembling a composite representation of the subject of interest. This camera position data may comprise camera location data, indicating a location for the mobile device at the time the digital image data was captured, or camera orientation data, indicating an orientation for the mobile device at the time the digital image data was captured, or both.

In some embodiments, processing circuit 610 may be further configured to determine a desired reference position with respect to the subject of interest and to form a positioning instruction based on the desired reference position. In such embodiments, processing circuit 610 may send the positioning instruction to the mobile communication device, using the communication network interface; the positioning instruction may be sent as part of the image capture request. The positioning instruction may reference location data, reference orientation data, or both, for use in capturing the digital image data.

Those skilled in the art will appreciate that several of the methods described above, including especially the methods described in reference to FIGS. 4 and 5, may be implemented at a camera-equipped mobile communication device. An exemplary mobile device 700 is pictured in FIG. 7. Those skilled in the art will recognize that the pictured mobile device 700 may comprise a mobile telephone, a personal digital assistance (PDA) device with mobile telephone capabilities, a laptop computer, or other device with communication and camera capabilities. Mobile device 700 includes a wireless unit 710 configured to communicate with other devices using one or more wireless networks, under the control of processing circuit 720. Wireless unit 710 may be configured for operation with one or more wide-area networks, such as a W-CDMA network, or a wireless local area network (W-LAN), such as an IEEE 802.11 network. In some embodiments, mobile device 700 may also include a wired network interface for operation with a wired network, such as an Ethernet interface (not shown).

Figure 7:
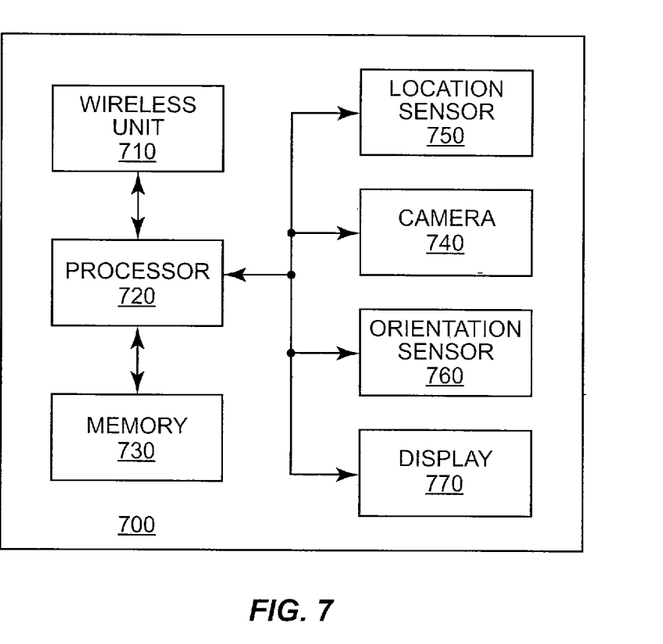
FIG. 7 is a block diagram illustrating an exemplary mobile communication device according to some embodiments of the invention.

Mobile device 700 further comprises location sensor 750 and orientation sensor 760. In some embodiments, location sensor 750 may include a complete GPS receiver capable of autonomously determining the device's location. In other embodiments, a GPS receiver with less than full functionality may be included, for taking measurements of GPS signals and reporting the measurements to a network-based system for determination of the mobile device's location. In still others, location sensor 750 may be configured to measure time differences between received cellular signals (or other terrestrial signals) for calculation of the device's location. In some cases this calculation may be performed by the location sensor 750; in others, the results of the measurements are transmitted to a network-based system, using wireless unit 710, for final determination of the device's location. Orientation sensor 760 may include one or more devices for determining orientation of the device, such as an electronic compass, a gyroscope or other device for sensing tilt, and the like. One or more of these sensors may be a MEMS device, as discussed above.

Mobile device 700 also includes camera 740 and may include various other real-time sensors, such as a microphone (not shown). The camera 740, location sensor 750, and orientation sensor 760 are each coupled to and controlled by processing circuit 720. In various embodiments of the present invention, processing circuit 720, configured by appropriate software stored in memory 730, is configured to carry out one or more of the methods described above. In particular, processing circuit 720 may be configured to receive an image capture request from a remote device, via the wireless communication unit and to alert the device's user to the image capture request, using a device display 770. The processing circuit may be further configured to send digital image data to the remote device, via the wireless communication unit, responsive to user initiation of an image capture operation subsequent to the alert.

In some embodiments, the image capture request may comprise a positioning instruction, in which case processing circuit 720 may be configured to alert the user to the image capture request by altering the display 770 of the mobile communication device based on the positioning instruction. In some of these embodiments, the positioning instruction may comprise reference orientation data, in which case processing circuit 720 may be further configured to alter the display 770 of the mobile communication device 700 by displaying one or more orientation guides based on the reference orientation data and a current orientation for the mobile communication device 700. Similarly, in some embodiments, the positioning instruction may include reference location data, in which case processing circuit 720 may be further configured to alter the display 770 of the mobile communication device 700 by displaying one or more location guides based on the reference location data and a current location for the mobile communication device 700. Finally, processing circuit 720 may be further configured to send current location data, current orientation data, or both, to the remote device, wherein the current location data, current orientation data, or both, are obtained from location sensor 750 and orientation sensor 760, and indicate the position of the mobile communication device 700 at the time of the image capture operation.

Those skilled in the art will appreciate that the various functions of image collection server 600 and mobile device 700 may be implemented with customized or off-the-shelf hardware, general purpose or custom processors, or some combination. Accordingly, each of the described processing blocks may in some embodiments directly correspond to one or more commercially available or custom microprocessors, microcontrollers, or digital signal processors. In other embodiments, however, two or more of the processing blocks or functional elements of server 600 or device 700 may be implemented on a single processor, while functions of other blocks are split between two or more processors. One or more of the functional blocks pictured in FIG. 7 or 8 may also include one or more memory devices containing software, firmware, and data, including stored media data files, for processing multimedia in accordance with one or more embodiments of the present invention. Thus, these memory devices may include, but are not limited to, the following types of devices: cache, ROM, PROM, EPROM, EEPROM, flash, SRAM, and DRAM. Those skilled in the art will further appreciate that functional blocks and details not necessary for an understanding of an invention have been omitted from the drawings and discussion herein.

Those skilled in the art should thus appreciate that the present invention broadly provides methods and apparatus for collecting digital images associated with a photographic subject of interest. Embodiments of the present invention include, but are not limited to, the following:

(a) A method of collecting digital image data associated with a subject of interest, comprising: receiving location data for a camera-equipped mobile communication device in visual proximity to the subject of interest; determining whether the location data corresponds to a desired view of the subject of interest; sending an image capture request to the mobile communication device, responsive to said determining; and receiving digital image data from the mobile communication device in response to the image capture request.

(b) A method as in (a), further comprising: receiving camera position data corresponding to the digital image data and storing the camera position data in association with the digital image data for use in assembling a composite representation of the subject of interest.

(c) A method as in (b), wherein the camera position data comprises camera location data, indicating a location for the mobile communication device at the time the digital image data was captured, or camera orientation data, indicating an orientation for the mobile communication device at the time the digital image data was captured, or both.

(d) A method as in (a), further comprising: determining a desired reference position with respect to the subject of interest; forming a positioning instruction based on the desired reference position; and sending the positioning instruction to the mobile communication device.

(e) A method as in (d), wherein the positioning instruction comprises reference location data, reference orientation data, or both, for use in capturing the digital image data.

(f) An image collection server comprising a communication network interface and one or more processing circuits configured to: receive, via the communication network interface, location data for a camera-equipped mobile communication device in visual proximity to a subject of interest; determine whether the location data corresponds to a desired view of the subject of interest; send, using the communication network interface, an image capture request to the mobile communication device, responsive to said determining; and receive, via the communication network interface, digital image data from the mobile communication device in response to the image capture request.

(g) An image collection server as in (f), wherein the one or more processing circuits are further configured to: receive camera position data corresponding to the digital image data; and store the camera position data in association with the digital image data for use in assembling a composite representation of the subject of interest.

(h) An image collection server as in (g), wherein the camera position data comprises camera location data, indicating a location for the mobile communication device at the time the digital image data was captured, or camera orientation data, indicating an orientation for the mobile communication device at the time the digital image data was captured, or both.

(i) An image collection server as in (f), wherein the one or more processing circuits are further configured to: determine a desired reference position with respect to the subject of interest; form a positioning instruction based on the desired reference position; and send the positioning instruction to the mobile communication device, using the communication network interface.

(j) An image collection server as in (i), wherein the positioning instruction comprises reference location data, reference orientation data, or both, for use in capturing the digital image data.

(k) A method of collecting image data with a camera-equipped mobile communication device, comprising: receiving an image capture request from a remote device; alerting a user of the mobile communication device to the image capture request; and sending digital image data to the remote device, responsive to user initiation of an image capture operation subsequent to the alert.

(l) A method as in (k), wherein the image capture request comprises a positioning instruction and wherein alerting the user to the image capture request comprises altering a display of the mobile communication device based on the positioning instruction.

(m) A method as in (l), wherein the positioning instruction comprises reference orientation data, and wherein altering the display of the mobile communication device comprises displaying one or more orientation guides based on the reference orientation data and a current orientation for the mobile communication device.

(n) A method as in (l), wherein the positioning instruction comprises reference location data, and wherein altering the display of the mobile communication device comprises displaying one or more location guides based on the reference location data and a current location for the mobile communication device.

(o) A method as in (k), further comprising sending current location data, current orientation data, or both, to the remote device, wherein the current location data, current orientation data, or both, indicate the position of the mobile communication device at the time of the image capture operation.

(p) A mobile communication device, comprising a wireless communication unit, an image capture device, a display and one or more processing circuits configured to: receive an image capture request from a remote device, via the wireless communication unit; alert a user of the mobile communication device to the image capture request, using the display; and send digital image data to the remote device, via the wireless communication unit, responsive to user initiation of an image capture operation subsequent to the alert.

(q) A mobile communication device as in (p), wherein the image capture request comprises a positioning instruction and wherein the one or more processing circuits are configured to alert the user to the image capture request by altering a display of the mobile communication device based on the positioning instruction.

(r) A mobile communication device as in (q), wherein the positioning instruction comprises reference orientation data, and wherein the one or more processing circuits are configured to alter the display of the mobile communication device by displaying one or more orientation guides based on the reference orientation data and a current orientation for the mobile communication device.

(s) A mobile communication device as in (q), wherein the positioning instruction comprises reference location data, and wherein the one or more processing circuits are configured to alter the display of the mobile communication device by displaying one or more location guides based on the reference location data and a current location for the mobile communication device.

(t) A mobile communication device as in (p), wherein the one or more processing circuits are further configured to send current location data, current orientation data, or both, to the remote device, wherein the current location data, current orientation data, or both, indicate the position of the mobile communication device at the time of the image capture operation.

The present invention may, of course, be carried out in other specific ways than those set forth without departing from the scope of the inventive techniques illustrated by the specific embodiments illustrated herein. Thus, the present invention is not limited to the features and advantages detailed in the foregoing description, nor is it limited by the accompanying drawings. Indeed, the present invention is limited only by the following claims and their legal equivalents.

What is claimed is:

1. A method of modifying a three-dimensional model of a real-world subject of interest, comprising:
   determining that a database of digital image data used for building the three-dimensional model of the real-world subject of interest sparsely represents a desired view of the real-world subject of interest;
   receiving location data by an image collection server for a mobile communication device in visual proximity to the real-world subject of interest;
   determining that the location data corresponds to the desired view of the real-world subject of interest;
   sending an image capture request from the image collection server to the mobile communication device responsive to said determining, said image capture request requesting the mobile communication device to capture an image of the desired view; and
   receiving digital image data that corresponds to the image of the desired view of the real-world subject of interest from the mobile communication device in response to the image capture request;
   modifying the three-dimensional model of the real-world subject of interest based on the received digital image data;
   wherein the image collection server is a master device configured to coordinate collection of images by one or more slave devices including the mobile communication device in response to the image collection server being within radio communication range of the real-world subject of interest, the mobile communication device, or both.

2. The method of claim 1, further comprising:
   receiving camera position data corresponding to the digital image data; and
   storing the camera position data in association with the digital image data for use in assembling the three-dimensional model of the real-world subject of interest.

3. The method of claim 2, wherein the camera position data comprises camera location data, indicating a location for the mobile communication device at the time the digital image data was captured, or camera orientation data, indicating an orientation for the mobile communication device at the time the digital image data was captured, or both.

4. The method of claim 1, further comprising:
   determining a desired reference position with respect to the real-world subject of interest;

forming a positioning instruction by the image collection server based on the desired reference position; and sending the positioning instruction from the image collection server to the mobile communication device.

5. The method of claim 4, wherein the positioning instruction comprises reference location data, reference orientation data, or both, for use in capturing the digital image data.

6. The method of claim 1, wherein the image collection server:
is configured to coordinate the collection of images in further response to the image collection server being in visual proximity to the real-world subject of interest; and
comprises a camera configured to capture images.

7. An image collection server comprising:
a communication network interface configured to exchange signals with a network; and
one or more processing circuits communicatively coupled to the communication network interface and configured to:
determine that a database of digital image data used for building a three-dimensional model of the real-world subject of interest sparsely represents a desired view of the real-world subject of interest;
receive, via the communication network interface, location data for a mobile communication device in visual proximity to the real-world subject of interest;
determine that the location data corresponds to the desired view of the real-world subject of interest;
send, using the communication network interface, an image capture request to the mobile communication device responsive to said determining, said image capture request requesting the mobile communication device to capture an image of the desired view; and
receive, via the communication network interface, digital image data that corresponds to the image of the desired view of the real-world subject of interest from the mobile communication device in response to the image capture request;
modifying the three-dimensional model of the real-world subject of interest based on the received digital image data;

wherein the image collection server is a master device that coordinates collection of images by one or more slave devices including the mobile communication device in response to the image collection server being within radio communication range of the real-world subject of interest, the mobile communication device, or both.

8. The image collection server of claim 7, wherein the one or more processing circuits are further configured to:
receive camera position data corresponding to the digital image data; and
store the camera position data in association with the digital image data for use in assembling the three-dimensional model of the real-world subject of interest.

9. The image collection server of claim 8, wherein the camera position data comprises camera location data, indicating a location for the mobile communication device at the time the digital image data was captured, or camera orientation data, indicating an orientation for the mobile communication device at the time the digital image data was captured, or both.

10. The image collection server of claim 7, wherein the one or more processing circuits are further configured to:
determine a desired reference position with respect to the real-world subject of interest;
form a positioning instruction based on the desired reference position; and
send the positioning instruction to the mobile communication device, using the communication network interface.

11. The image collection server of claim 10, wherein the positioning instruction comprises reference location data, reference orientation data, or both, for use in capturing the digital image data.

12. The image collection server of claim 7, wherein the image collection server:
is configured to coordinate the collection of images in further response to the image collection server being in visual proximity to the real-world subject of interest; and
comprises a camera configured to capture images.

* * * * *